(12) United States Patent
Rich et al.

(10) Patent No.: US 9,887,438 B2
(45) Date of Patent: Feb. 6, 2018

(54) ELECTRONIC DEVICE THERMAL MANAGEMENT SYSTEM

(71) Applicant: GrafTech International Holdings Inc., Brooklyn Heights, OH (US)

(72) Inventors: David G. Rich, Middleburg Heights, OH (US); Martin D. Smalc, Parma, OH (US)

(73) Assignee: NeoGraf Solutions, LLC, Lakewood, OH (US)

( * ) Notice: Subject to any disclaimer, the term of this patent is extended or adjusted under 35 U.S.C. 154(b) by 0 days.

(21) Appl. No.: 14/912,998

(22) PCT Filed: Aug. 13, 2014

(86) PCT No.: PCT/US2014/050894
§ 371 (c)(1),
(2) Date: Feb. 19, 2016

(87) PCT Pub. No.: WO2015/031061
PCT Pub. Date: Mar. 5, 2015

(65) Prior Publication Data
US 2016/0204489 A1 Jul. 14, 2016

Related U.S. Application Data

(60) Provisional application No. 61/869,932, filed on Aug. 26, 2013.

(51) Int. Cl.
*H01M 6/50* (2006.01)
*H01M 10/617* (2014.01)
(Continued)

(52) U.S. Cl.
CPC ....... *H01M 10/617* (2015.04); *H01M 10/623* (2015.04); *H01M 10/655* (2015.04); *H01M 10/66* (2015.04); *H01M 2220/30* (2013.01)

(58) Field of Classification Search
CPC .................................................. H01M 6/5038
See application file for complete search history.

(56) References Cited

U.S. PATENT DOCUMENTS

| 2004/0032371 A1 | 2/2004 | Mendolia et al. |
| 2009/0169781 A1 | 7/2009 | Schaepkens et al. |

(Continued)

FOREIGN PATENT DOCUMENTS

| WO | 2013/025595 | 2/2013 |

OTHER PUBLICATIONS

International Search Report filed in PCT/US14/050894 dated Nov. 21, 2014.

(Continued)

*Primary Examiner* — Jacob Marks

(57) ABSTRACT

An electronic device has a heat source and a generally rectangular shape battery proximate the heat source. The battery may have first and second major surfaces. A thermal regulator is in thermal contact with both of the heat source and substantially all of at least the first major surface of the battery. During operation of the device, heat transferred from the heat source to the first major surface via the thermal regulator balances the temperature profile exhibited along the first major surface such that it is substantially uniform.

20 Claims, 2 Drawing Sheets

(51) Int. Cl.
*H01M 10/623* (2014.01)
*H01M 10/66* (2014.01)
*H01M 10/655* (2014.01)

(56) References Cited

U.S. PATENT DOCUMENTS

| | | | |
|---|---|---|---|
| 2010/0319895 A1* | 12/2010 | Chen | F28D 15/046 |
| | | | 165/185 |
| 2011/0242764 A1 | 6/2011 | Hill et al. | |
| 2012/0061135 A1 | 3/2012 | Hill et al. | |
| 2012/0088130 A1* | 4/2012 | Becker | H01M 10/6561 |
| | | | 429/71 |
| 2013/0130757 A1 | 5/2013 | Luo et al. | |
| 2013/0209858 A1 | 8/2013 | Schmitt et al. | |
| 2013/0266839 A1* | 10/2013 | Miura | H01M 10/50 |
| | | | 429/120 |
| 2013/0323564 A1 | 12/2013 | Beyerle, II et al. | |
| 2014/0234686 A1* | 8/2014 | Sweney | H01M 2/1077 |
| | | | 429/120 |
| 2014/0308558 A1* | 10/2014 | Merriman | H01M 10/0481 |
| | | | 429/120 |

OTHER PUBLICATIONS

Extended European Search Report of corresponding EP Application No. 14840436.1, dated Apr. 18, 2017.

* cited by examiner

ELECTRONIC DEVICE THERMAL MANAGEMENT SYSTEM

BACKGROUND OF THE DISCLOSURE

Technical Field

The disclosed embodiments relate to a thermal management system for portable electronic devices, particularly for a device which includes a contemporary generation battery or a next generation battery.

Technical Background

Ever since the invention of the portable transistor radio, there has been an interest in portable, now known as "mobile", electronic devices. This interest started with AM radios which people could carry and was continued with cameras and a combination cassette tape player-radio, e.g., the Walkman® radio, and now includes devices such as cameras, mobile telephones, mobile computers, tablets, MP3 players and other devices.

As the portable/mobile devices evolved over the decades so have the demands and capabilities of such devices. With each generation of devices, the devices have been able to provide more content to their users at ever higher bandwidths and in more user friendly formats, as well as giving users the ability to create, modify and deliver content from their devices. As the convenience of these devices increased so did the power requirements for the devices as well as the technology associated with the battery for such devices. These latter generation devices contained more energy and generated greater power and consequently generated more heat. In addition to the batteries, the hardware items e.g., radios, displays and processing units, of the devices also became more powerful and likewise created additional thermal issues for such devices. Consequently as these devices have become more powerful, the demands on the batteries for such devices will also increase.

BRIEF DESCRIPTION

An embodiment disclosed herein is for an electronic device having a heat source and a generally rectangular shape battery proximate the heat source. The battery may have first and second major surfaces. A thermal regulator is in thermal contact with both of the heat source and substantially all of the first major surface of the battery. During operation of the device, heat is transferred from the heat source to the first major surface via the thermal regulator which balances the temperature profile along the first major surface such that a substantially uniform profile is exhibited.

It is to be understood that both the foregoing general description and the following detailed description provide embodiments of the disclosure and are intended to provide an overview or framework of understanding to nature and character of the invention as it is claimed.

DETAILED DISCLOSURE

Figure 1:
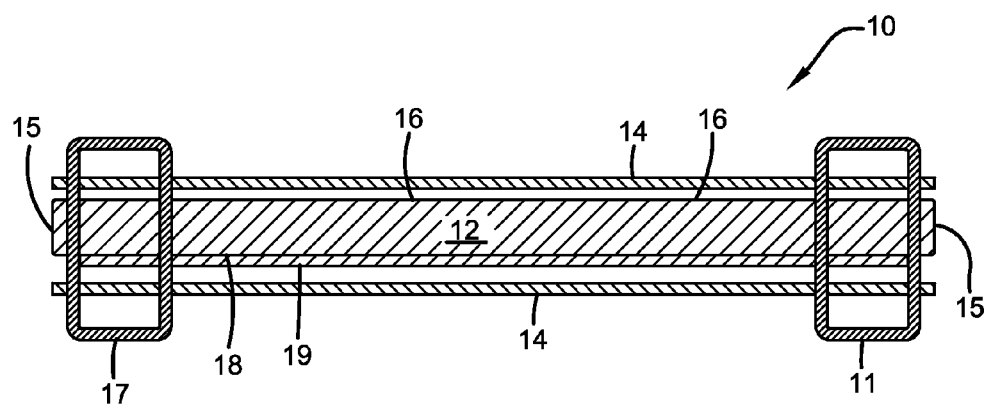
FIG. 1 is a schematic view of a first embodiment.

The embodiments disclosed herein have application to various mobile devices such as but not limited to cellular telephones commonly referred to as "smartphones", notebook computers, netbooks, ultra-books, laptops, tablets, MP-3 players, and cameras. These types of devices may be generically referred to as mobile devices.

It has come to light that as the components included in such mobile devices such as but not limited to the central processing unit "CPU", the graphical processing unit "GPU", the drive chip, the memory chip, RF power amplifiers and transceivers, DC/DC switchers for any or all onboard radio types (CDMA, GSM, WCDMA/UMTS, and LTE, plus their data equivalents; Wi-Fi, BT, GPS, NFC, etc.), PMIC (Power Management Integrated Circuit) such as buck and/or boost inductors and power converters, and/or wireless charging elements, high speed digital electronics (such as cameras image processing and stabilizing elements, still or video image lighting sources), display elements (LEDs, OLEDs and their drivers), disk drives (such as CD/DVD/Blue-Ray drives) and high-speed USB ports or other ports used for high-power applications such as used for charging or operating peripherals have become more powerful the heat generated inside the device has also increased. All of the above components may be generally referred to as a heat source or sources for the purpose of this disclosure.

The embodiments disclosed herein relate to an electronic device. Typically the device will include a heat source, e.g., one of the above components, and a generally rectangular shape battery proximate the heat source. Examples of the battery being proximate to the heat source include the battery aligned vertically, horizontally, diagonally, or a combination thereof to the heat source. Additionally the battery may have first and second major surfaces. Further the device may include a thermal regulator in thermal contact with both of the heat source and substantially all of at least the first major surface of the battery. The thermal contact may occur by any means of heat transfer such as conduction, convection, radiation and any combination thereof.

During operation of the device, heat is transferred from the heat source to the first major surface via the thermal regulator. Preferably a temperature profile of the first major surface is substantially uniform. Substantially uniform is meant herein to mean a less than a (ten) 10° C. differential exhibited between the hottest spot and the coolest spot on the major surface, preferably a less than a (five) 5° C. differential, and even more preferably a less than a (three) 3° C. differential.

Examples of the types of batteries that may be applicable to the embodiments disclosed herein include a nickel-cadmium battery, lithium ion battery, a lithium polymer battery, nickel metal-hydride or lithium-phosphate, etc. The above embodiments may likewise be applicable to next generation batteries also. Additionally, the embodiments are applicable to either removable batteries or non-removable batteries. The removable battery is capable of being removed from the device without damaging the electronic device and/or any of the other components included in the device.

Optionally the electronic device may further comprise a near field communication ("NFC") element proximate one of the major surfaces of the battery. An example of an NFC element may include a copper wire coated in plastic.

In another optional embodiment, the thermal regulator may be in thermal contact with substantially all of the second major surface of the battery, whereby during operation of the device, heat is transferred from the heat source to the second major surface via the thermal regulator and a temperature profile of the second major surface is substantially uniform. In a further optional embodiment, the thickness of a portion of the thermal regulator in thermal contact with the second major surface comprises no more than half of the thickness of a second portion of the thermal regulator in thermal contact with the first major surface of the battery. In one specific embodiment, the thickness of the portion comprises no more than 0.50 mm and a thickness of the second portion comprises up to 1.0 mm. The thickness of any such portion may include a thickness in the range of 1 mm to 0.010 mm.

In another alternate embodiment, the anisotropic ratio of the in-plane conductivity to the through-plane conductivity of the portion of the thermal regulator in thermal contact with the second major surface comprises no more than 60:1, preferably no more than 50:1, even more preferably no more than 40:1.

Alternatively, the electronic device may further comprise an EMI shield proximate the first the major surface of the battery. Preferably the first major surface is located opposed to the exterior back surface of the device. In a further alternative embodiment, the EMI shield may extend around a majority of an exterior of the battery. Majority is used herein to mean more than 50% of the surface area of the battery. This embodiment may extend further to when the EMI shield extends completely around the battery. Alternatively, the EMI shield may extend around any portion of the battery which may generate an EMI concern. The reason for such concern may be inside or outside of the device or may even be the user for the device. The EMI shield may not be part of the thermal regulator or part of the thermal path to transmit heat from the heat source to the battery.

In a particular embodiment, the thermal regulator comprises one of more sheets of compressed particles of exfoliated graphite particles. Any example of such sheets include eGraf® thermal solutions available from GrafTech International Holdings Inc. of Parma, Ohio. Specific examples include the GrafTech's SS300, SS400, SS500 and SS600 materials. In addition to the EGRAF Spreadershield™ materials, GrafTech's HiTherm™ thermal interface materials may also have application as part of the thermal regulator. The sheet(s) may or may not include one or more EMI additives. Preferably the EMI additives attenuate low frequencies ("frequency attenuating material"), such as frequencies below three (3) gigahertz (GHz). These are additives that may be added to the sheet so that the sheet may be used as an EMI shield. Examples of such additives include high permeability materials for low frequency attenuation, such as nickel, copper, silver, tin, steel, stainless steel, gold, aluminum, alloys of any or all of the aforementioned materials and combinations thereof. One specific example includes mu-metal such as permalloy.

Alternatively, instead of the sheet of compressed particles of exfoliated graphite particles, the thermal regulator may comprise a graphitized polyimide sheet such as GrafTech's SS1500 material. If so desired the thermal regulator may include the graphitized polyimide sheet in combination with a sheet of compressed particles of exfoliated graphite.

The electronic device may also include a thermal interface material disposed between a surface of the heat source and the thermal regulator. An example of a suitable thermal interface will include GrafTech's HiTherm™ materials.

In another alternate embodiment, the electronic device includes a second heat source in thermal contact with the thermal regulator.

The embodiments disclosed herein will now be further discussed relative to FIGS. 1-5. Shown in FIG. 1 is an embodiment 10 of the battery 12 with the thermal regulator 14 shown on the first and the second major surfaces 16, 18, the major surfaces extending between oppositely disposed terminal ends 15 of battery 12. In FIG. 1, the NFC element 19 is located above regulator 14 adjacent major surface 18 of battery 12. Alternatively embodiment 10 may include additional optional thermal regulators 17 and 11, each one wrapped around a respective terminal end 15 of battery 12. Not shown is the heat source and thermal regulator 14 extending toward the heat source.

Figure 2:
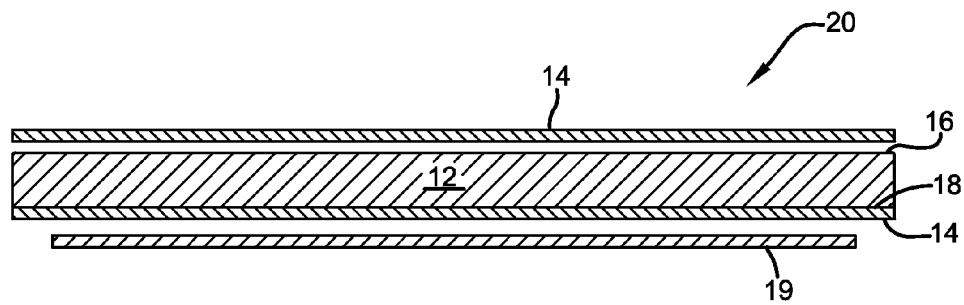
FIG. 2 is a schematic view of a second embodiment

FIG. 2 differs from FIG. 1 that in embodiment 20, NFC element 19 is outside of thermal regulator 14 such that the thermal regulator 14 is disposed between NFC element 19 and the battery 12, instead of being disposed inside of thermal regulator 14 such that the NFC element 19 is disposed between the thermal regulator 14 and battery 12 as shown in FIG. 1. As used herein NFC element 19 as shown in FIGS. 1 and 2 is still proximate battery 12.

Figure 3:
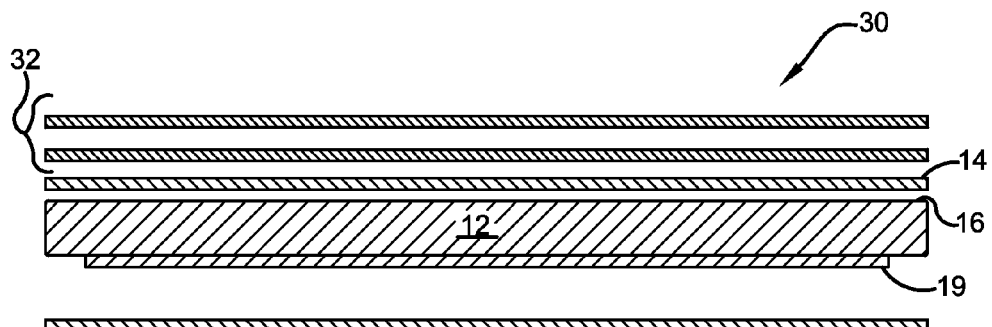
FIG. 3 is a schematic view of a third embodiment.

FIG. 3 differs from FIG. 1 in that it includes an EMI shield 32 located outside of thermal regulator 14 on the first major surface 16 of battery 12. As shown the EMI shield includes two (2) layers of metal. In a particular embodiment the two metal layers are cooper. Preferably the EMI shield is located between battery 12 and one or more components which are desired to be shielded from EMI generated by battery 12. An example of such component may include the screen of the device.

Figure 4:
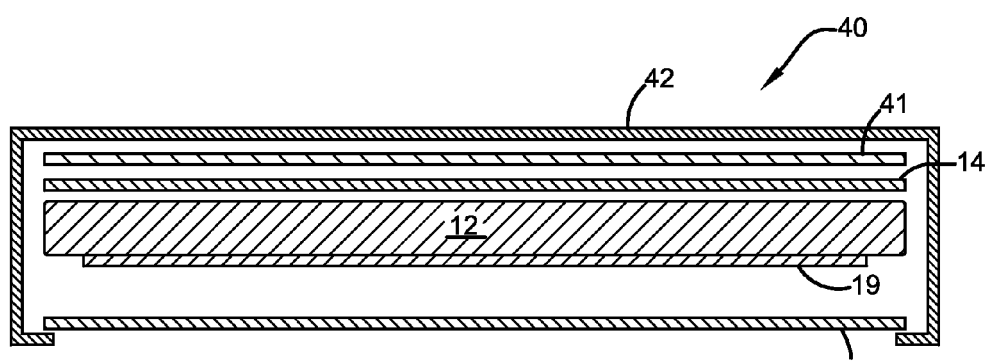
FIG. 4 is a schematic view of a fourth embodiment.

FIG. 4, embodiment 40 is similar to FIG. 3 except instead of the EMI shield consisting of two (2) sheets of metal, the EMI shield includes the first metal 41 as shown in FIG. 3 and a second metal sheet 42 wrapped around a majority of the exterior surface area of battery 12.

Figure 5:
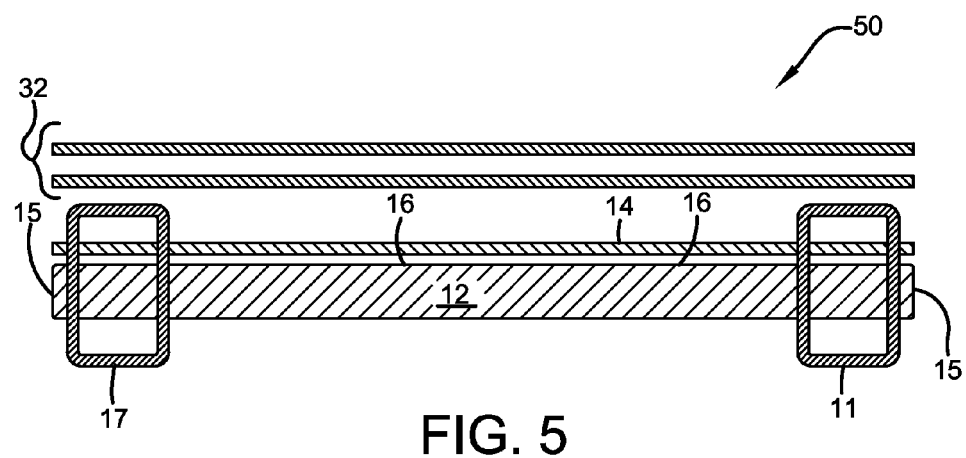
FIG. 5 is a schematic view of a fifth embodiment.

FIG. 5, embodiment 50 is another alternative embodiment. Battery 12 of FIG. 5 includes the additional thermal regulators 17 and 11 around each terminal end 15 of battery 12 as shown in FIG. 1. Optionally, regulator 17 may be located along only one of the terminal end 15 without the use of regulator 11. Optionally and similar to other embodiment, regulator 14 is located proximate to first major surface 16 of battery 12 or the second surface 18 if so desired by the device designer. Additionally, embodiment 50 includes EMI shield 32 above regulator 14. A dielectric adhesive may be used to adhere the two (2) copper sheets of EMI shield 32 together. The use of the dielectric adhesive may be incorporated into other embodiments as may be beneficial. Embodiment 50 may also include an NFC element proximate either of major surface 16 or 18 if so desired by the device designer.

An advantage of the embodiment disclosed herein is that the various cells in the battery may be maintained at a substantially uniform temperature during use of the device. This reduces/eliminates degradation of the battery caused by such hot spots.

The above description is intended to enable the person skilled in the art to practice the invention. It is not intended to detail all the possible variations and modifications that will become apparent to the skilled worker upon reading the description. It is intended, however, that all such modifications and variations be included within the scope of the invention that is defined by the following claims.

Although there have been described particular embodiments it is not intended that such references be construed as limitations upon the scope of this invention except as set forth in the following claims. The various embodiments discussed above may be practiced in any combination thereof.

What is claimed is:

1. An electronic device comprising:
   a. a heat source wherein the heat source consists of at least one of a central processing unit, a graphical processing unit, a drive chip, a memory chip, a radio frequency (RF) power amplifier, an RF transceiver, a DC/DC switcher, a Power Management Integrated Circuit, a buck and/or boost inductor, a power converter, a wireless charging element, a high speed digital electronics, a cameras image processing and stabilizing element, a still or video image lighting source, a display element, a display element driver, a disk drive a high-speed USB port, and a high-power application port, b. a generally rectangular shaped battery proximate the heat source
   i. the battery having first and second major surfaces extending between oppositely disposed terminal ends, and c. a thermal regulator comprising at least one of a sheet of compressed particles of exfoliated graphite particles, a graphitized polyimide sheet and a combination thereof in thermal contact with both of the heat source and substantially all of the first major surface of the battery, whereby, during operation of the device, heat is transferred from the heat source to the first major surface via the thermal regulator and a temperature profile of the first major surface being substantially uniform.

2. The electronic device of claim 1 further comprising a near field communication element proximate one of the major surfaces of the battery and between the terminal ends.

3. The electronic device of claim 1 further comprising the thermal regulator in thermal contact with substantially all of the second major surface of the battery, whereby during operation of the device, heat transferred from the heat source to the second major surface via the thermal regulator and a temperature profile of the second major surface being substantially uniform.

4. The electronic device of claim 3 wherein a thickness of a portion of the thermal regulator in thermal contact with the second major surface comprises no more than half of the thickness of a second portion of the thermal regulator in thermal contact with the first major surface of the battery.

5. The electronic device of claim 4 wherein an anisotropic ratio of the in-plane conductivity to the through-plane conductivity of the portion of the thermal regulator in thermal contact with the second major surface comprises no more than 60:1.

6. The electronic device of claim 4 wherein a thickness of the portion comprises no more than 0.50 mm and a thickness of the second portion comprises up to 1.0 mm.

7. The electronic device of claim 1 further comprising an EMI shield proximate the first the major surface of the battery and the first major surface located opposed to the exterior back surface of the device.

8. The electronic device of claim 1 further comprising an EMI shield around a majority of an exterior of the battery.

9. The electronic device of claim 1 wherein the thermal regulator comprises one of more sheets of compressed particles of exfoliated graphite particles.

10. The electronic device of claim 9 wherein the sheet doped with a frequency attenuating material.

11. The electronic device of claim 1 wherein the sheet includes one or more EMI shield additives.

12. The electronic device of claim 1 further comprising a thermal interface material disposed between a surface of the heat source and the thermal regulator.

13. The electronic device of claim 1 further comprising a second heat source in thermal contact with the thermal regulator.

14. The electronic device of claim 1 further comprising an EMI shield around any portion of the battery that generates an EMI concern.

15. The electronic device of claim 11 wherein the additive includes permalloy mu metal.

16. The electronic device of claim 11 wherein the additive includes at least one of nickel, silver, tin, steel, stainless steel, gold, aluminum, and alloys thereof.

17. The electronic device of claim 1 wherein the thermal contact occurs by conduction.

18. The electronic device of claim 1 wherein the near field communication element is disposed outside of the thermal regulator such that the thermal regulator is disposed between the near field communication element and the battery.

19. The electronic device of claim 1 wherein the near field communication element is disposed inside of the thermal regulator such that the near field communication element is disposed between the thermal regulator and the battery.

20. The electronic device of claim 1 further comprising an EMI shield consisting of a first sheet of metal proximate the first major surface of the battery and a second sheet of metal disposed around a majority of an exterior of the battery.

* * * * *